US 011410359B2

(12) United States Patent
Hutten et al.

(10) Patent No.: US 11,410,359 B2
(45) Date of Patent: Aug. 9, 2022

(54) CONTENT AND CONTEXT MORPHING AVATARS

(71) Applicant: Wormhole Labs, Inc., Huntington Beach, CA (US)

(72) Inventors: Curtis Hutten, Laguna Beach, CA (US); Robert D. Fish, Irvine, CA (US); Brian Kim, Walnut, CA (US)

(73) Assignee: Wormhole Labs, Inc., Sherman Oaks, CA (US)

( * ) Notice: Subject to any disclaimer, the term of this patent is extended or adjusted under 35 U.S.C. 154(b) by 0 days.

(21) Appl. No.: 16/810,824

(22) Filed: Mar. 5, 2020

(65) Prior Publication Data

US 2021/0279930 A1 Sep. 9, 2021

(51) Int. Cl.
*A63F 13/79* (2014.01)
*G06T 11/60* (2006.01)
*H04L 67/52* (2022.01)
*H04L 67/131* (2022.01)
*G06N 5/04* (2006.01)
*G06N 20/00* (2019.01)

(52) U.S. Cl.
CPC .......... *G06T 11/60* (2013.01); *G06N 5/04* (2013.01); *G06N 20/00* (2019.01); *H04L 67/18* (2013.01); *H04L 67/38* (2013.01); *A63F 13/79* (2014.09); *A63F 2300/5546* (2013.01)

(58) Field of Classification Search
None
See application file for complete search history.

(56) References Cited

U.S. PATENT DOCUMENTS

| | | | |
|---|---|---|---|
| 7,945,856 B2 * | 5/2011 | Leahy | H04L 12/1813 715/706 |
| 8,108,774 B2 | 1/2012 | Finn et al. | |
| 9,303,996 B2 * | 4/2016 | Huang | G01C 21/3679 |
| 2006/0028475 A1 | 2/2006 | Tobias | |
| 2007/0273644 A1 * | 11/2007 | Mondine Natucci | H04N 1/00323 345/156 |
| 2009/0063283 A1 * | 3/2009 | Kusumoto | G06Q 30/0214 705/14.25 |
| 2010/0070858 A1 | 3/2010 | Morris et al. | |
| 2014/0128166 A1 * | 5/2014 | Tam | A63F 13/46 463/42 |
| 2014/0245192 A1 * | 8/2014 | Chavez | G06F 3/04815 715/757 |
| 2015/0032766 A1 * | 1/2015 | Greenbaum | G06F 16/444 707/756 |
| 2016/0299563 A1 * | 10/2016 | Stafford | G06F 16/9535 |
| 2016/0300387 A1 * | 10/2016 | Ziman | G06F 3/147 |
| 2016/0342303 A1 | 11/2016 | Van Wie et al. | |
| 2017/0080346 A1 * | 3/2017 | Abbas | A63F 13/79 |
| 2017/0213473 A1 * | 7/2017 | Ribeira | G16H 40/67 |
| 2018/0348863 A1 * | 12/2018 | Aimone | A61B 5/0476 |
| 2019/0163259 A1 * | 5/2019 | Baughman | G06T 13/80 |
| 2019/0187780 A1 * | 6/2019 | Hayashida | G06T 13/40 |
| 2019/0208273 A1 * | 7/2019 | Johnson | H04N 21/458 |
| 2019/0295056 A1 * | 9/2019 | Wright | G06T 19/006 |
| 2020/0125390 A1 * | 4/2020 | Kim | G06N 20/00 |

(Continued)

*Primary Examiner* — David H Chu
(74) *Attorney, Agent, or Firm* — Fish IP Law, LLP

(57) ABSTRACT

Systems and methods disclosed herein create or modify a personalized mixed reality environment by taking into consideration both a user preferences and the actual location characteristics of the user.

10 Claims, 6 Drawing Sheets

(56) References Cited

U.S. PATENT DOCUMENTS

| | | | |
|---|---|---|---|
| 2020/0219319 A1* | 7/2020 | Lashmar | H04L 63/10 |
| 2020/0223352 A1* | 7/2020 | Toshio Kimura | G05D 1/0088 |
| 2020/0233681 A1* | 7/2020 | Garstenauer | G06F 3/011 |

* cited by examiner

CONTENT AND CONTEXT MORPHING AVATARS

FIELD OF THE INVENTION

The field of the invention is management of mixed reality environments.

BACKGROUND

The inventive concepts herein aim to integrate combinations of augmented reality spaces, interactive objects, and virtual reality spaces to dynamically tailor environments based the local environmental context of the user.

Specifically, the present invention enables individuals to enter into the augmented reality spaces of others and interact with others, while the user's avatar and environment dynamically change based on user-based parameters and location-based parameters. For example, the present invention contemplates analyzing context data source, such as crowd-sourced location data, imaging of the surrounding environment, event schedules, and any other data source, to customize the appearance of the user's avatar and/or change the environment around the user's avatar in a mixed reality space It is contemplated that the changes can be visible to anyone in the shared virtual space, a specific group of users in the shared virtual space, and/or to the user alone.

To further increase the relevance of an augmented reality to a user, the augmented realities herein curate spaces that dynamically adapt to the local environmental context by, for example, matching the theme of the surroundings gathered through camera imaging, public event schedules, and user profiles. At a nightclub, for example, a user who is head of security may want to put a digital marker on anyone above 21; the nightclub owner may want to promote a different alcohols to different age demographics; the performer may want different augmented reality visual effects to be displayed at specific times in the performance; lastly, the user may want to be shown in a particular avatar outfit. The methods and systems described herein enable these interests to be captured and implemented to varying degrees based on the users in a mixed reality environment, such as an augmented reality.

Additionally, shared curated spaces can be morphed to a customized environment based on the users therein. For example, if the context module determines that each user within an augmented reality or virtual space is a fan of a sci-fi television show, the context module can morph the environment to reflect the shared interests of the user. In other instances, the environment can be morphed based on each user's unique interests.

U.S. Pat. No. 8,108,774 to Finn teaches an avatar mimicry system that copies the avatars of those around the subject. Finn fails to modify the avatar based on both user-based parameters and location-based parameters, which can create a shared reality without creating a homogenous mixture of avatars that are each mimicking each other.

US Patent Application Pub. No. 2017/0080346 to Abbas teaches biometric scanning of users to modify their avatar appearance to reflect their current physical state. Abbas also contemplates association of a user avatar to the services of specific companies, such as Ford™ to interact virtually with their products and services. However, Abbas similarly fails to modify the avatar based on both user-based parameters and location-based parameters.

In gaming, it is generally known that players can move between virtual spaces by teleporting. However, these game worlds are largely tied to predetermined structures, limited customization specific to the game, and linked to other preselected areas. For example, a game such as The Sims™ allows users to engage with each other in a shared virtual space with each home built and accessorized using an in-game engine. Unlike The Sims™, the inventive concept herein contemplates a highly customizable mixed reality space that can link to any number of other customized mixed reality spaces. The present invention also contemplates enabling users to tie customizable functions, avatar appearances, and environmental features/effects.

Finn, Abbas, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for mixed reality system infrastructures that can customize user augmented realities and avatar characteristics dynamically based on the changing context of a user's current environment.

SUMMARY OF THE INVENTION

The inventive concept herein contemplates virtual reality, augmented reality, and/or mixed reality environments that are highly customizable with various interactive elements. It is contemplated that the interactive elements can be at least partially customized by a context module associated with the mixed reality space. It is further contemplated that the context module can analyze the context of a user's environment using a combination of data sources and alter a user's environment accordingly.

The present invention contemplates that the context module can retrieve and analyze context data associated with the user. The context module applies at least one of a user parameter and a location parameter to the context data and determines whether at least one of an avatar modification and an environment modification is available. For example, the context module can determine that one or more avatar appearances and one or more environmental themes are available based on a mixture of user preferences and available location-specific modifications. Responsive to determining that at least one of the avatar modification and the environment modification is available, the context module modifies a least one of an avatar and an augmented reality environment of the user. For example, after determining that a user is older than 21 and is a huge fan of a beer brand, context module can modify the user's avatar to have a virtual t-shirt with the beer brand and modify the environment to focus on beer-focused visual elements, such as advertisements and environment markers.

Modification to the user's virtual environment are contemplated to include both environmental features as well as the features associated with the user. For example, the user's virtual environment can include both the actual surroundings and the appearance of the user's avatar.

The present invention contemplates using context data to enhance the user's environment and avatar in various practical applications, including, but not limited to, Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to access mixed reality environments. Mixed reality environments can include any combination of virtual and augmented reality environments and can be connected to each other in any manner.

For the purposes of this application, sub-environments can comprise any one or more of an augmented reality, a virtual reality, and any other interactive media format. For example, a primary sub-environment can be a first augmented reality, and a secondary sub-environment can be a second augmented reality connected to the first through a portal.

For the purposes of this application, "portal" or any similar terms, such as "portalling" and "portalled", mean any connected between environments. Portals can be in the form of interactive objects, designated spaces, or any other form that allows a user to connect to other augmented realities and/or virtual realities.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
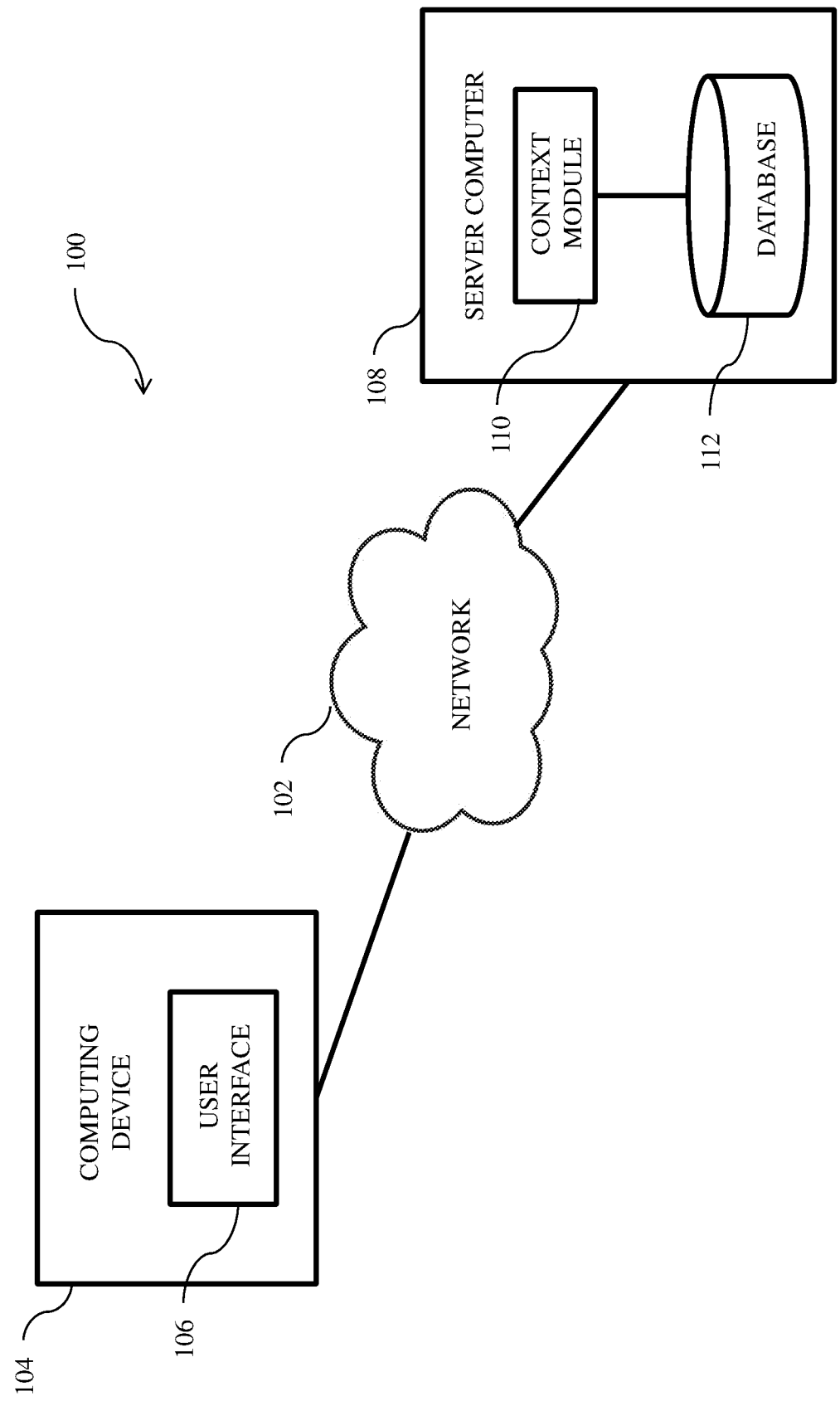
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to context module 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure context module 110 (discussed in more detail below) to enable a user to access a mixed reality space. It is contemplated that user interface 106 can allow a user to provide any information to context module 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by context module 110. In the depicted embodiment, context module 110 resides on server computer 108. However, database 112 can reside anywhere within a distributed data processing environment provided that context module 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
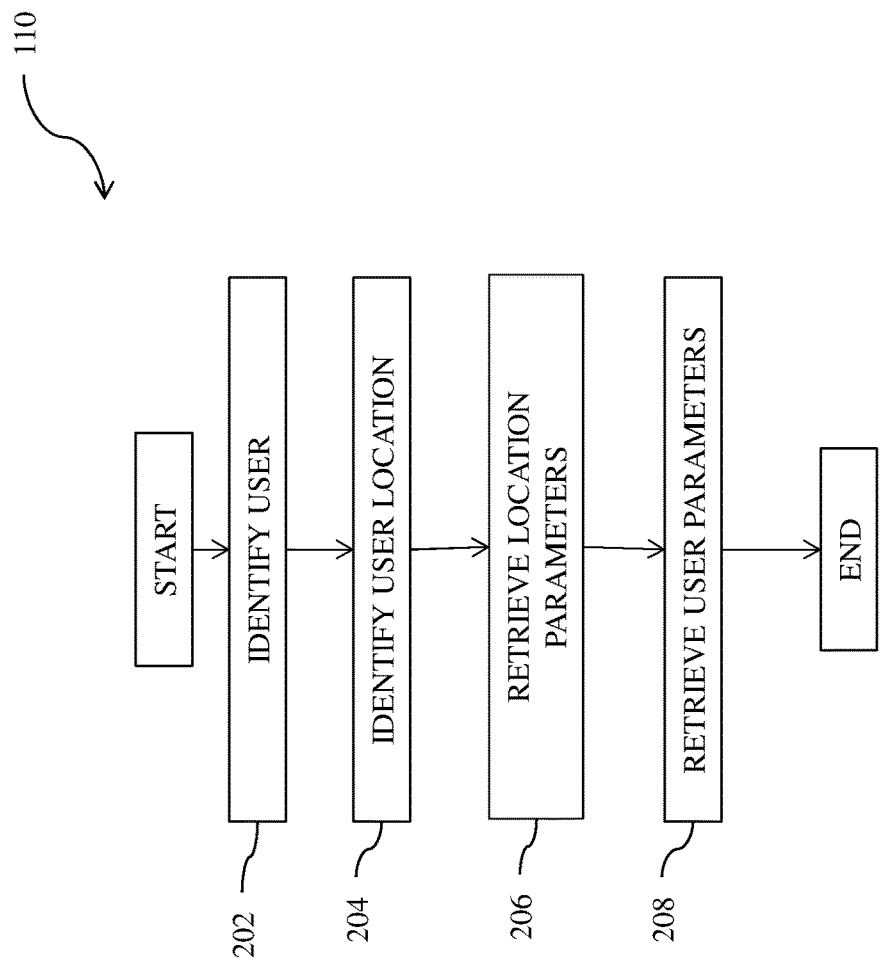
FIG. 2 is a schematic of a method of identifying a user and a user location and retrieving their respective parameters.

FIG. 2 is a schematic of a method of identifying a user and a user location and retrieving their respective parameters.

Context module 110 identifies a user (step 202).

Context module 110 can identify a user in any manner known in the art. In one embodiment, context module 110 identifies a user through a signal sent through computing device 104. For example, context module 110 can be tied to software, such as a smart phone app, that can register various user actions, including, but not limited to, purchases, browsing, public posts on social media by the user and/or third-parties, and user subscriptions. It is contemplated that context module 110 and any associated software can include various user-controllable parameters to alter how much data is shared with context module 110.

In another embodiment, context module 110 identifies a user through one or more preselected sources. For example, context module 110 can integrate with a social media application, which can receive location information associated with a user when the user makes a social media post through their smartphone.

In another embodiment, context module 110 cooperates with one or more hardware functions, such as the accelerometer and a facial recognition camera on a smartphone. In this example, context module 110 can identify the user associated with facial recognition software and track the accelerometer to determine whether the user is on the move.

In yet another embodiment, context module 110 receives a direct log-in from the user. For example, a user can download an application associated with an augmented reality platform using context module 110. When the user logs in and starts using the software, context module 110 can directly track one or more types of data associated with the user.

Context module 110 determines a user location (step 204).

Context module 110 can determine a user location in any manner known in the art.

In one embodiment, context module 110 uses hardware to determine the location of a user. For example, context module 110 can retrieve information from a global positioning module of a smartphone to determine the location of the user.

In another example, context module 110 can triangulate the position of a user based on the user's proximity to one or more cellular towers.

In yet another example, context module 110 can determine the proximity of the user to a cluster of other user devices, such as in a music festival where many users are clustered together, to approximate the location of the user.

In another embodiment, context module 110 uses software means to determine the location of a user. For example, context module 110 can analyze the last social media post of a user to approximate where the user currently is. In a more specific example, context module 110 can identify a tag on a social media post of a user indicating the location of the post to be a famous restaurant in the city.

Context module 110 retrieves location parameters associated with the user (step 206).

Location parameters can include any variable associated with the location of the user. Location parameters can include, but are not limited to, rules regarding other mixed reality participants, businesses, color schemes, schedules, promotions, and restrictions.

In some embodiments, a location parameter is a rule associated with a characteristic of the location itself. For example, a location within 100 yards of a school can restrict user avatars to those that are classified as appropriate for children 13 years and younger. In another example, a location within a graveyard can restrict auditory messages sent between users and only permit text-based communications.

In other embodiments, a location parameter is a rule associated with a characteristic of a user in the location. For example, a user that is younger than 13 years old can be restricted in a particular location from seeing 18+ content in a mixed reality powered movie theater. In another example, a user that does not have a virtual event ticket can be filtered out and prevented from seeing the augmented reality-based projections on top of green screens in the event area.

In one embodiment, context module 110 stores location parameters database 112.

In other embodiments, context module 110 remotely stores data using a network of remotely connected computers, such as a cloud computing environment. For example, context module 110 can store data stored across multiple computers, such as smartphones. In another example, context module 110 can send the data through network 102 to be stored in one or more remote servers. However, context module 110 can store location parameters in any medium available in the art.

Context module 110 retrieves user parameters (step 208).

User parameters can include any variables associated with a user. User parameters can include, but are not limited to, rules regarding any one or more characteristics of a user (e.g., age, sex, membership, etc.).

In one embodiment, user parameters include rules associated with an administrator of context module 110 that apply, by default, to a user based on one or more user characteristics.

For example, context module 110 can determine that a user that is a fan of a particular gaming team is primarily shown highlights from the user's favorite team and players on augmented reality powered displays in a video game competition. In another example, each user in a card-based gaming tournament can only be given the option to put down augmented reality assets on the table that they selected prior to the tournament in an augmented reality "deck".

In another embodiment, user parameters include user-selected rules regarding one or more variables.

For example, a user that identifies with a religion that restricts the use of alcohol and tobacco can input one or more user-selected parameters restricting context module 110 from displaying any advertisements associated with tobacco and/or alcohol in a mixed reality environment.

In another example, context module 110 can receive a list of one or more banned cards in an augmented reality-based card game that two opponents agree to in advance. Based on the rules selected by the opposing teams, context module 110 can restrict the display of the banned cards during play.

Figure 3:
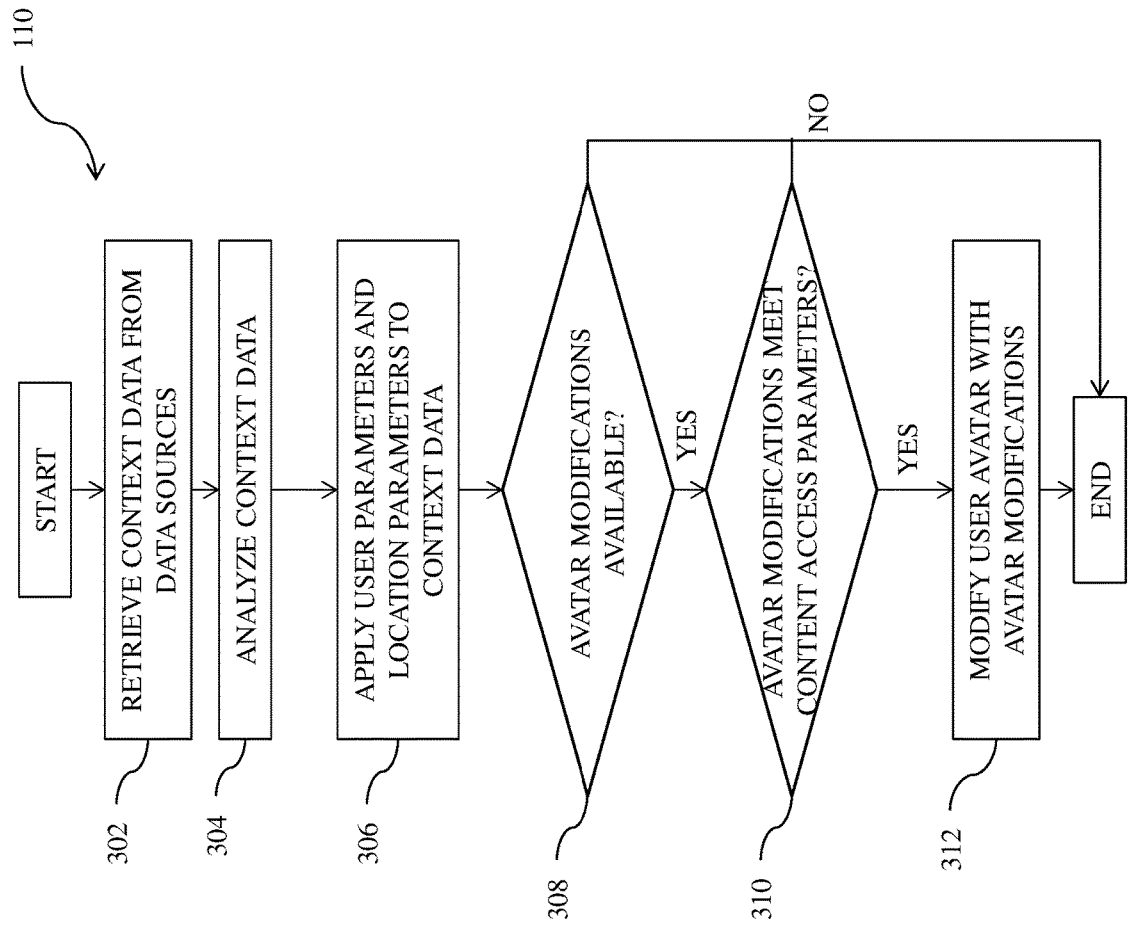
FIG. 3 is a schematic of a method of modifying the appearance of an avatar of a user based on context data.

FIG. 3 is a schematic of a method of modifying the appearance of an avatar of a user based on context data.

Context module 110 retrieves context data from one or more data sources (step 302).

Data sources can include any data store containing context data. In some embodiments, context data can be historical data. For example, context data can include one or more user-specific historical preferences for a particular location.

In other embodiments, context data can be real-time, substantially real-time, and/or periodically captured data associated with a user. For example, context data can include real-time location tracking and periodic access to a camera coupled to computing device 104.

In some embodiments, data sources can include third-party data storage services. For example, context module 110 can retrieve context data from a gaming company that collects data through its players in order to provide context to a gaming event and the users therein.

It is contemplated, however, that data sources can include any mixture of context data.

Context module 110 analyzes the context data (step 304).

Context data include any data associated with the environment around the user, including, but not limited to, the types of people in the environment, the time of day, the day of week, and significant events happening in or around a location. Context data can also include information about the user themselves, including, for example, where the user came from, what the user's avatar looks like, and what modifications to the environment that the user responds positively to in the particular location. However, it is contemplated that context data can be any data associated with the user in relation to the user's environment.

Context module 110 can analyze context data in any manner known in the art. In one embodiment, context module 110 can analyze historical user data only using traditional algorithms. For example, context module 110 can analyze the percentage of total play time dedicated to a particular game character to determine which modifications to a user's augmented reality interface should be applied. In another example, context module 110 can analyze submitted user preferences prior to a gaming event and use a filtering algorithm to highlight specific elements in the user's mixed reality environment (e.g., turning up the brightness on content for a game company).

In another embodiment, context module 110 can analyze context data using machine learning algorithms, which include, but are not limited to, supervised learning classifiers, time-series analysis, and linear regression analysis. For example, context module 110 can predict a change in the environment, such as a gaming competition coming up at 3:00 PM, and correspondingly predict the type of environment that will create. In a more specific example, context module 110 can review the historical user comments associated with a professional gamer's streaming videos and predict that the crowd will have a balance of males and females with a preference for a specific character in a video game.

In another example, a linear regression analysis can applied to the user location data to predict what a user will do next (e.g., move to the fighting game section of a gaming convention) and those predictions can be used to apply predicted user parameters and predicted location parameters for the predicted user location in one hour. In yet another example, context engine 110 can determine, through context data, that a first team beat a second team in a sporting event that the user is currently attending. By determining through traditional algorithms that the user is a fan of the second team and, through machine learning algorithms, that the user always goes to a particular bar after a loss, content module 110 can predict the next environment of the user and tone down the mixed reality of the user to avoid louder sounds and the color scheme of the first team.

Context module 110 applies user parameters and location parameters to context data (step 306).

In one embodiment, context module 110 applies both user parameters and location parameters to the context data. For example, context module 110 can apply a user's sex, age, color scheme preferences, and historical in-game purchase data to a gaming convention having booths with mature content. As a result, context module can determine that the user parameter and location parameters, when applied to the context data, allow a first set of avatar and/or environmental effects to be displayed in an augmented reality interface. In a more specific related example, context module 110 can determine that the augmented reality environment of the user cannot include material restricted to those older than 16 years, should be primarily focused on a particular game, and should include visual effect based on the particular game.

In another example, a supervised learning classifier can be used to identify pictures of friends that commonly play with the user in a particular video game. Based on the identified pictures, context module 110 determine that each of the users associated with the group of friends should be assigned matching avatar clothing and shared environmental features, such as a virtual shrine to their gaming clan adorned with the clan's logo.

Context module 110 determines whether avatar modifications are available (decision block 308).

Context module 110 determines whether there are any avatar modifications available in the local environmental context based on the application of user parameters and location parameters to the context data.

In a first embodiment, context module 110 determines whether there are any appearance modifications available for a user avatar. For example, context module 110 can determine whether a user avatar should be changed to reflect the outfit that they have in a game that is being highlighted at a gaming event. In another example, context module 110 can determine whether a user avatar should be switched to a summer skin or a winter skin selected from the costumes in a game that is the current subject of a gaming event.

In a related embodiment, context module 110 determines which virtual skills can be applied to a user's avatar. For example, context engine 110 can determine that a first user's video game character is able to speak telepathically. As such, context engine 110 can allow the first user to send "telepathic" messages to one or more recipients by recording the user's voice and then projecting it to the targets of the message. In a related embodiment, context engine 110 can determine that a second user's video game character is able to use magic to open sealed passages. In response, context engine 110 can allow the second user to complete a specific hand motion that can open virtual loot boxes to reveal items in augmented reality that are transferred to the second user's account to be used in-game.

Responsive to determining that avatar modifications are available ("YES" branch, decision block 308), context module 110 determines whether an avatar modification meets content access parameters (decision block 310).

Content access parameters can include any rules associated with available modifications to the user's mixed reality environment or the user's avatar. In some embodiments, content access parameters restrict available avatar modifications based on predetermined rules. For example, context module 110 can restrict an avatar modification associated with a video game soldier during times when a tournament for another game is being broadcast. In another example, context module 110 can restrict an avatar modification associated a video game franchise based on previously determined rights to the intellectual property. In yet another example, context module 110 can restrict avatar modifications for a group of event goers based on the demographics of the group, which includes user that are restricted from seeing particular content.

Responsive to determining that avatar modifications are not available ("NO" branch, decision block 308), context module 110 ends.

Responsive to determining that the avatar modification meets the content access parameters ("YES" branch, decision block 310), context module 110 modifies the user avatar with one or more avatar modifications (step 312).

As discussed above, avatar modifications can include, but are not limited to, an avatar appearance and/or one or more capabilities of the avatar.

Responsive to determining that avatar modifications do not meet the content access parameters ("NO" branch, decision block 310), context module 110 ends.

Figure 4:
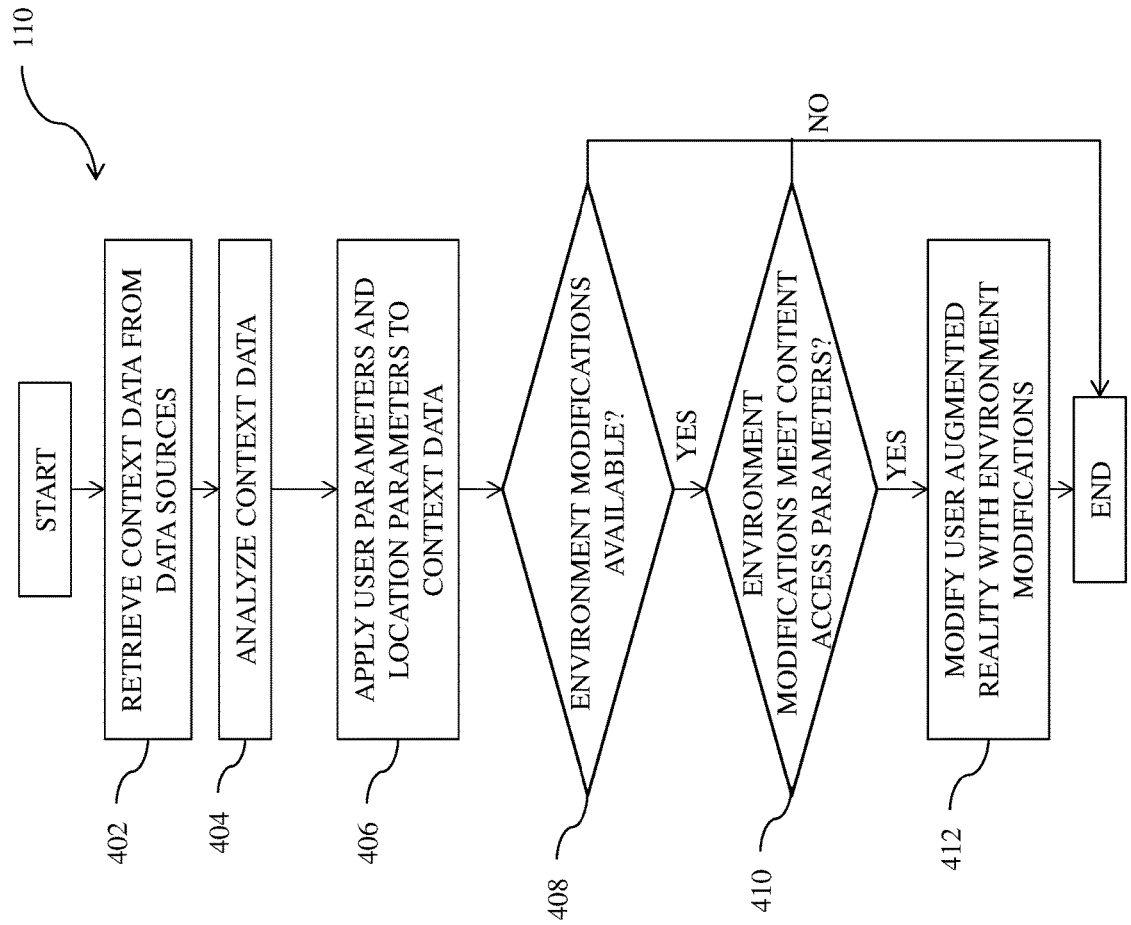
FIG. 4 is a schematic of a method of modifying the appearance of a user's augmented reality environment based on context data.

FIG. 4 is a schematic of a method of modifying the appearance of a user's augmented reality environment based on context data.

Context module 110 retrieves context data from one or more data sources (step 402).

Data sources can include any data store containing context data. In some embodiments, context data can be historical data. For example, context data can include one or more user-specific historical preferences for a particular location.

In other embodiments, context data can be real-time, substantially real-time, and/or periodically captured data associated with a user. For example, context data can include real-time location tracking and periodic access to a camera coupled to computing device 104.

In some embodiments, data sources can include third-party data storage services. For example, context module 110 can retrieve context data from a gaming company that collects data through its players in order to provide context to a gaming event and the users therein.

It is contemplated, however, that data sources can include any mixture of context data.

Context module 110 analyzes the context data (step 404).

Context data include any data associated with the environment around the user, including, but not limited to, the types of people in the environment, the time of day, the day of week, and significant events happening in or around a location. Context data can also include information about the user themselves, including, for example, where the user came from, what the user's avatar looks like, and what modifications to the environment that the user responds positively to in the particular location. However, it is contemplated that context data can be any data associated with the user in relation to the user's environment.

Context module 110 can analyze context data in any manner known in the art. In one embodiment, context module 110 can analyze historical user data only using traditional algorithms. For example, context module 110 can analyze the percentage of total play time dedicated to a particular game character to determine which modifications to a user's augmented reality environment reflecting the style of that character should be applied.

In another embodiment, context module 110 can analyze context data using machine learning algorithms, which include, but are not limited to, supervised learning classifiers, time-series analysis, and linear regression analysis. For example, context module 110 can predict a change in the environment, such as a gaming competition coming up at 3:00 PM, and correspondingly predict the type of environment that will create. In a more specific example, context module 110 can review the historical user comments associated with a professional gamer's streaming videos and predict that the crowd will have a balance of males and females with a preference for a specific character in a video game.

In another example, a linear regression analysis can applied to the user location data to predict what a user will do next (e.g., move to the fighting game section of a gaming convention) and those predictions can be used to apply predicted user parameters and predicted location parameters for the predicted user location in one hour. In yet another example, context engine 110 can determine, through context data, that a first team beat a second team in a sporting event that the user is currently attending. By determining through traditional algorithms that the user is a fan of the second team and, through machine learning algorithms, that the user always goes to a particular bar after a loss, content module 110 can predict the next environment of the user and tone down the mixed reality of the user to avoid louder sounds and the color scheme of the first team.

Context module 110 applies user parameters and location parameters to context data (step 406).

In one embodiment, context module 110 applies both user parameters and location parameters to the context data. For example, context module 110 can apply a user's sex, age, color scheme preferences, and historical in-game purchase data to a gaming convention having booths with mature content. As a result, context module can determine that the user parameter and location parameters, when applied to the context data, allow a first set of avatar and/or environmental effects to be displayed in an augmented reality interface. In a more specific related example, context module 110 can determine that the augmented reality environment of the user cannot include material restricted to those older than 16 years, should be primarily focused on a particular game, and should include visual effect based on the particular game.

In another example, a supervised learning classifier can be used to identify pictures of friends that commonly play with the user in a particular video game. Based on the identified pictures, context module 110 determine that each of the users associated with the group of friends should be assigned matching avatar clothing and shared environmental features, such as a virtual shrine to their gaming clan adorned with the clan's logo.

Context module 110 determines whether environment modifications are available (decision block 408).

Context module 110 determines whether there are any environment modifications available in the local environmental context based on the application of user parameters and location parameters to the context data.

In a first embodiment, context module 110 determines whether there are any appearance modifications available for the user's walkabout reality environment, such as an augmented reality environment. For example, context module 110 can determine whether a user environment should be changed to reflect the environment of a game that is being highlighted at a gaming event, such as making a regular door appear as a castle door for a medieval sword fighting game. In another example, context module 110 can determine whether a user's environment should reflect the summer season appearance or the winter season appearance to reflect the time of year and the artwork style of the game.

In another example, context module 110 can use a camera on computing device 104 to determine that the surrounding area is dark and filled with warm lighting. In response, context module 110 can determine that a dark moody theme is appropriate and compile virtual assets to populate users environment, such as by turning a tree in the environment to a glowing and talking anthropomorphic tree.

In a related embodiment, context module 110 determines which environmental features and functionalities can be applied to a user's walkabout reality environment. For example, context engine 110 can determine that a first user's video game character is able to use a jump pad device. As such, context engine 110 can allow the first user to stand on a virtual jump pad to catapult themselves to higher floors in the virtual walkabout reality. In a related embodiment, context engine 110 can determine that a second user's video game character is able to use magic to see secret entrances and context clues. In response, context engine 110 can allow the second user to see hidden features in the virtual environment, such as a secret door, that have a secondary function.

Responsive to determining that environment modifications are available ("YES" branch, decision block 408), context module 110 determines whether an environment modification meets content access parameters (decision block 410).

Content access parameters can include any rules associated with available modifications to the user's mixed reality environment or the user's avatar. In some embodiments, content access parameters restrict available avatar modifications based on predetermined rules. For example, context module 110 can restrict an avatar modification associated with a video game soldier during times when a tournament for another game is being broadcast. In another example, context module 110 can restrict an avatar modification associated a video game franchise based on previously determined rights to the intellectual property. In yet another example, context module 110 can restrict avatar modifications for a group of event goers based on the demographics of the group, which includes user that are restricted from seeing particular content.

Responsive to determining that environment modifications are not available ("NO" branch, decision block 408), context module 110 ends.

Responsive to determining that the environment modification meets the content access parameters ("YES" branch, decision block 410), context module 110 modifies the user environment with one or more environment modifications (step 412).

As discussed above, environment modifications can include, but are not limited to, an environment appearance and/or one or more functionalities tied to a virtual walkabout environment. It is contemplated that the functionalities can also simultaneously be tied to real-world objects. For example, a virtual button appearing in a user's walkabout reality can open a real locked door when pressed.

Responsive to determining that environment modifications do not meet the content access parameters ("NO" branch, decision block 410), context module 110 ends.

Figure 5:
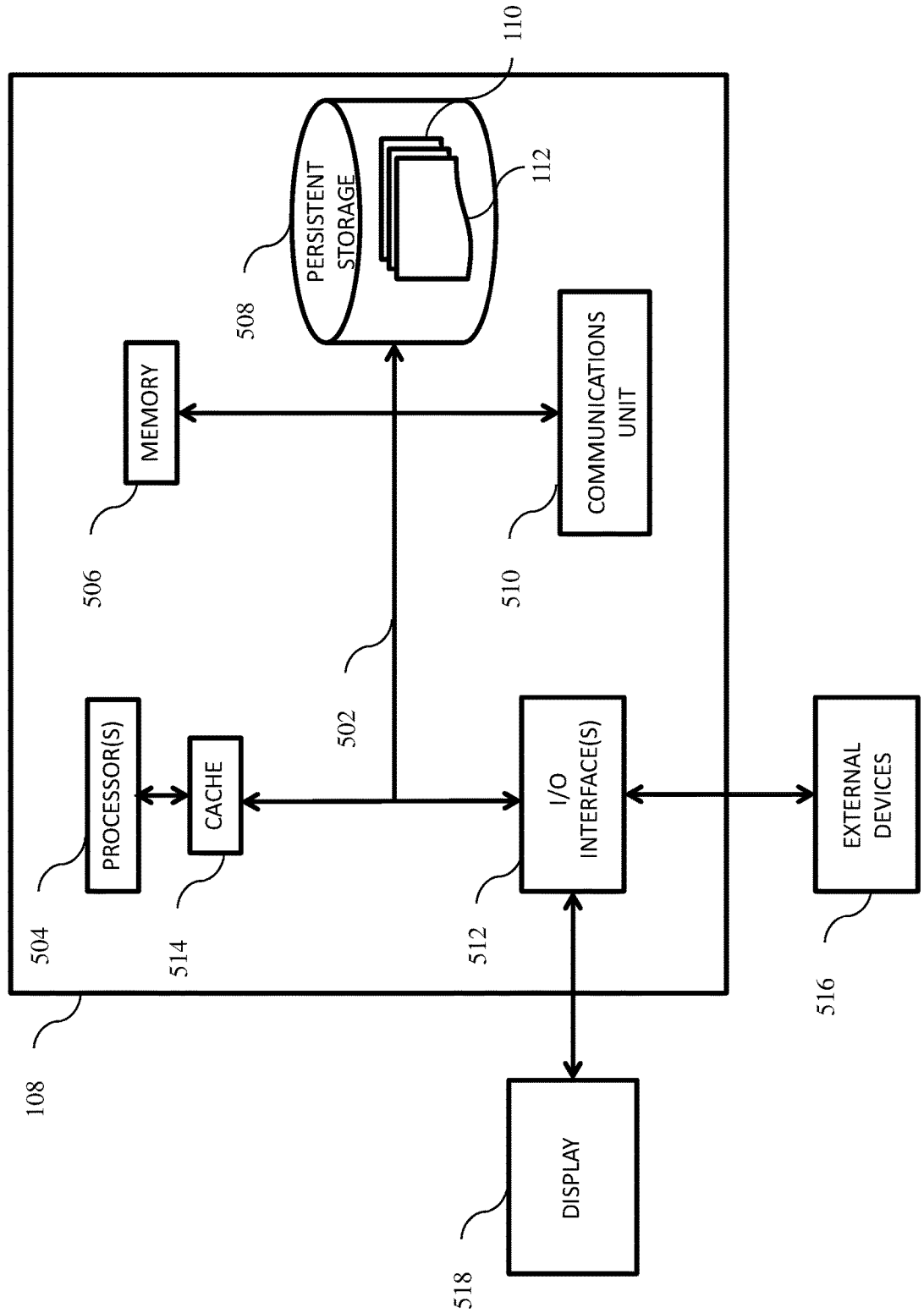
FIG. 5 depicts a block diagram of components of the server computer executing the mixed reality engine within the distributed data processing environment of FIG. 1.

FIG. 5 depicts a block diagram of components of the server computer executing the tracking engine 110 within the distributed data processing environment of FIG. 1. FIG. 5 is not limited to the depicted embodiment. Any modification known in the art can be made to the depicted embodiment.

In one embodiment, the computer includes processor(s) 504, cache 514, memory 506, persistent storage 508, communications unit 510, input/output (I/O) interface(s) 512, and communications fabric 502.

Communications fabric 502 provides a communication medium between cache 514, memory 506, persistent storage 508, communications unit 510, and I/O interface 512. Communications fabric 502 can include any means of moving data and/or control information between computer processors, system memory, peripheral devices, and any other hardware components.

Memory 506 and persistent storage 508 are computer readable storage media. As depicted, memory 506 can include any volatile or non-volatile computer storage media. For example, volatile memory can include dynamic random-access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 506 and persistent storage 508 are random access memory and a hard drive hardwired to computing device 504, respectively. For example, computing device 504 can be a computer executing the program instructions of context module 110 communicatively coupled to a solid-state drive and DRAM.

In some embodiments, persistent storage 508 is removable. For example, persistent storage 508 can be a thumb drive or a card with embedded integrated circuits.

Communications unit 510 provides a medium for communicating with other data processing systems or devices, including data resources used by computing device 104. For example, communications unit 510 can comprise multiple network interface cards. In another example, communications unit 510 can comprise physical and/or wireless communication links.

It is contemplated that context module 110, database 112, and any other programs can be downloaded to persistent storage 508 using communications unit 510.

In a preferred embodiment, communications unit 510 comprises a global positioning satellite (GPS) device, a cellular data network communications device, and short to intermediate distance communications device (e.g., Bluetooth®, near-field communications, etc.). It is contemplated that communications unit 510 allows computing device 104 to communicate with other computing devices 104 associated with other users.

Display 518 is contemplated to provide a mechanism to display information from context module 110 through computing device 104. In preferred embodiments, display 518 can have additional functionalities. For example, display 518 can be a pressure-based touch screen or a capacitive touch screen.

In yet other embodiments, display 518 can be any combination of sensory output devices, such as, for example, a speaker that communicates information to a user and/or a vibration/haptic feedback mechanism. For example, display 518 can be a combination of a touchscreen in the dashboard of a car, a voice command-based communication system, and a vibrating bracelet worn by a user to communicate information through a series of vibrations.

It is contemplated that display 518 does not need to be physically hardwired components and can, instead, be a collection of different devices that cooperatively communicate information to a user.

Figure 6:
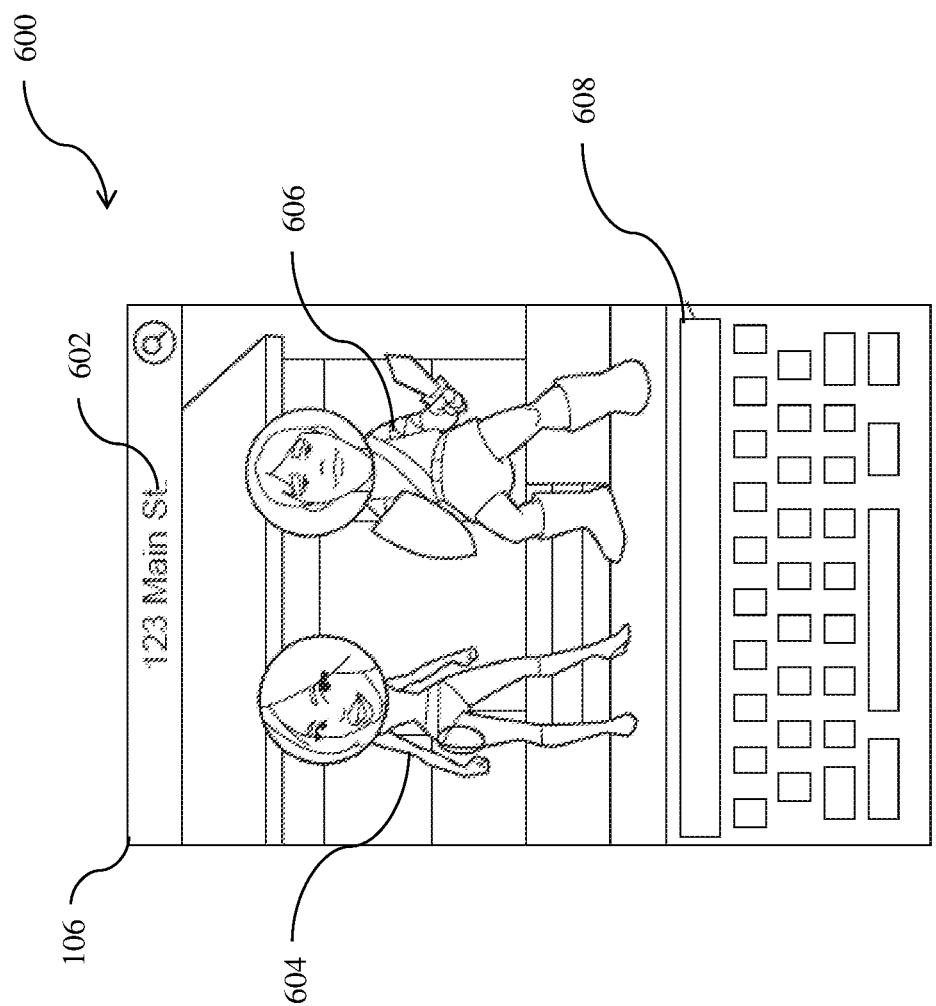
FIG. 6 depicts an augmented reality environment with modified avatars and modified augmented reality environments.

FIG. 6 depicts an augmented reality environment with modified avatars and modified augmented reality environments.

FIG. 6 depicts a modified augmented reality environment 600 based on the location and the surroundings of the user. In the depicted embodiment, augmented reality environment 600 is displayed through user interface 106 of computing device 104. Augmented reality environment 600 depicts a first user 604 and a second user 606 at an event, such as a comic book convention. User avatar 604 is depicted as a female superhero. User avatar 606 is depicted as a medieval knight. It is contemplated that users can use user interface 106 to customize an avatar or select an available avatar.

It is contemplated that context module 110 can use context data 602, depicted herein as a location, to gather the context of the user's environment. For example, based on context data including a time of day, a location, and a schedule of events for a venue, context module 110 can determine the theme and appropriate avatar and environment modifications for each user within 100 meters of a venue location in augmented reality environment 600.

User avatar 604 and user avatar 606 are not limited to the depicted embodiment. It is contemplated that user avatar 604 and user avatar 606 can comprise any visual, auditory, and tactile elements. For example, user avatar 604 can include a voice changer, a special effect when a user coupled to user avatar 604 makes a specific movement, and a triggering of vibrations in the smartphones of any user pointing their camera in the direction of user avatar 604.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

It should be apparent to those skilled in the art that many more modifications besides those already described are possible without departing from the inventive concepts herein. The inventive subject matter, therefore, is not to be restricted except in the scope of the appended claims.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using one or more computer processors to modify an augmented reality environment about a user, comprising:
   retrieving context data associated with a user;
   analyzing context data associated with the user;
   applying at least one of a user parameter and a location parameter to the context data;
   determining whether at least one of an avatar modification and an environment modification is available;
   responsive to determining that at least one of the avatar modification and the environment modification is available, modifying a least one of an avatar and an augmented reality environment of the user, wherein at least one of the avatar modification and the environment modification enables the user to perform an augmented-reality-based skill, and wherein the augmented-reality-based skill is executed by the user;
   predicting an upcoming real-world environment for the user based on an analysis of past behavior of a user with regard to the context data; and
   modifying a presentation of the augmented reality environment based on the prediction.

2. The method of claim 1, wherein analyzing context data comprises applying a traditional algorithm.

3. The method of claim 1, wherein analyzing context data comprises applying a machine learning algorithm.

4. The method of claim 3, wherein the machine learning algorithm is selected from a group consisting of: a linear regression algorithm, a supervised learning classifier, and a time-series analysis.

5. The method of claim 1, wherein the augmented reality is a shared virtual environment comprising multiple users.

6. The method of claim 1, wherein the avatar modification is at least one of a visual, auditory, and tactile modification.

7. The method of claim 1, wherein the environment modification is at least one of a visual, auditory, and tactile modification.

8. The method of claim 1, wherein the location parameter comprises user-submitted location data.

9. The method of claim 1, wherein the location parameter comprises crowd-sourced location data.

10. The method of claim 1, wherein modifying the virtual environments comprises modifying avatar functionality in the user virtual environment.

* * * * *